US007101053B2

(12) United States Patent
Parker (10) Patent No.: US 7,101,053 B2
(45) Date of Patent: Sep. 5, 2006

(54) MULTIDIRECTIONAL RETROREFLECTORS

(75) Inventor: David H. Parker, Earlysville, VA (US)

(73) Assignee: Associated Universities, Inc., Washington, DC (US)

( * ) Notice: Subject to any disclaimer, the term of this patent is extended or adjusted under 35 U.S.C. 154(b) by 41 days.

(21) Appl. No.: 10/916,612

(22) Filed: Aug. 12, 2004

(65) Prior Publication Data

US 2005/0157410 A1   Jul. 21, 2005

Related U.S. Application Data

(60) Provisional application No. 60/536,520, filed on Jan. 15, 2004.

(51) Int. Cl.
  G02B 5/122   (2006.01)
  G02B 7/182   (2006.01)
  G01B 11/02   (2006.01)
  G01B 11/14   (2006.01)

(52) U.S. Cl. .............. 359/529; 359/872; 359/638; 356/508; 356/614; 356/615; 356/622; 356/4.09; 356/510; 356/500; 356/487; 356/498; 356/124; 250/221

(58) Field of Classification Search ........ 359/224, 359/529, 638, 872, 578; 356/614, 615, 620, 356/622, 4.09, 500, 459, 510, 487, 498, 141.1, 356/139.08, 508, 124, 455, 486; 250/203.2, 250/221, 559.33; 430/5, 30; 33/293; 367/178
See application file for complete search history.

(56) References Cited

U.S. PATENT DOCUMENTS

| | | | | |
|---|---|---|---|---|
| 3,156,755 | A * | 11/1964 | Collyer | 356/152.3 |
| 3,158,674 | A * | 11/1964 | Woodson | 356/4.09 |
| 3,194,109 | A * | 7/1965 | Erickson | 356/508 |
| 3,471,239 | A * | 10/1969 | Woodson | 356/510 |
| 3,535,024 | A * | 10/1970 | Schindler | 359/224 |
| 3,671,130 | A * | 6/1972 | Bowker | 356/498 |
| 3,836,256 | A * | 9/1974 | Peters | 356/508 |
| 4,790,651 | A * | 12/1988 | Brown et al. | 356/4.09 |
| 5,289,434 | A * | 2/1994 | Berni | 367/178 |
| 5,446,546 | A * | 8/1995 | Breidenbach et al. | 356/35.5 |
| 5,530,549 | A * | 6/1996 | Brown | 356/622 |
| 5,861,956 | A * | 1/1999 | Bridges et al. | 356/614 |
| 5,920,394 | A * | 7/1999 | Gelbart et al. | 356/615 |
| 6,017,125 | A * | 1/2000 | Vann | 359/529 |
| 6,313,918 | B1 * | 11/2001 | Hill et al. | 356/498 |
| 6,362,468 | B1 * | 3/2002 | Murakami et al. | 250/221 |
| 6,420,694 | B1 * | 7/2002 | Greenwood | 250/221 |

* cited by examiner

*Primary Examiner*—Loha Ben
(74) *Attorney, Agent, or Firm*—Novak Druce & Quigg LLP (57) ABSTRACT

Multidirectional retroreflectors and methods of reflecting light beams from multiple directions are provided. The multidirectional retroreflectors utilize a four-mirror retroreflector with a common virtual reflection point.

24 Claims, 6 Drawing Sheets

FIG. 6C FRONT SIDE

FIG. 6B LEFT SIDE

FIG. 6A 3D VIEW

MULTIDIRECTIONAL RETROREFLECTORS

CLAIM OF PRIORITY

This application claims priority to U.S. Provisional Application No. 60/536,520 entitled "Attenuated Retroreflector" filed Jan. 15, 2004, the entirety of which is specifically incorporated by reference.

RIGHTS IN THE INVENTION

This invention was made, in part, with funding from the United States Government under Award No. AST-0223851 and, accordingly, the United States Government may have certain rights in this invention.

FIELD OF INVENTION

This invention relates to multidirectional retroreflectors. More specifically, this invention relates to multidirectional retroreflectors which use a four-mirror retroreflector with a common virtual reflection point.

BACKGROUND OF THE INVENTION

Large-scale metrology includes the measurement of coordinates over large distances, for example greater than the volume of a conventional coordinate measurement machine (CMM), which is typically limited to a cube of a few meters. There are many instances, for example in the aircraft industry, radio telescope and linear accelerator applications where measuring such distances is preferably accomplished with a high degree of accuracy. There are also field measurements of smaller scale which do not lend themselves to placement in a CMM, such as in situ measurements of machinery, outdoor measurements, shop floor measurements, etc.

The measurement of coordinates is typically accomplished by measuring a distance and two angles, as with a conventional surveying total station or laser tracking interferometer; the measurement of three orthogonal distances, as with a CMM; the measurement of angles from two locations on a known baseline, such as with theodolites; the measurement of spacing on a two-dimensional image projection from multiple locations, as with photogrammetry; the measurement of distance from three, or more, known locations on a baseline, as with multilateration; and various other manners.

One way to measure distances accurately is by using laser interferometry. In laser interferometry a coherent, monochromatic light beam from a laser is split into two beams using a beamsplitter. One beam, the reference beam, is focused onto a photosensitive detector. The second or measurement beam, is allowed to travel through space and strike a reflector positioned in space at the first of two measurement points. The reflector is adjusted to return the reference beam to the surface of the photosensitive detector. Here the reference and reflected measurement beams interfere. The target reflector can then be moved to the second point to be measured. As the target moves, the reflected measurement light beam is continuously focused onto the photosensitive detector, interfering with the reference beam. By electrically measuring the periodic variation of the detector output, one can measure differential lengths from the initial target position as multiples and fractions of the wavelength of the illuminating source.

In all of these laser interferometry devices, the reflective target is preferably oriented to return the reflected measurement beam to the photosensitive target of the detector from a wide range of beam angles. Typically, a retroreflector, such as a hollow three-mirror reflector, comprised of three carefully aligned orthogonal mirrors (typically on the order of one arc second), is used to return the beam. The retroreflector may have slightly less accuracy than a single flat mirror but only requires that the operator align the device so as to point towards the detector within a cone of perhaps 30–40 degrees in width. The reflected beam from the retroreflector undergoes reflections from all three orthogonal mirrors and has the interesting property that the return beam will emerge traveling parallel to the incoming beam, in the opposite direction, and displaced from the incoming beam by a distance of twice the distance from the incoming beam to the retroreflector apex, i.e., symmetrically about a parallel beam through the apex. The optical path length, and thus the time of flight, is virtually the same as the distance to the retroreflector apex. Therefore, the measurement is physically associated with the physical location of the retroreflector apex.

Electronic distance measurement (EDM) is commonly achieved by measuring the time of flight of an electromagnetic wave, such as a laser beam or microwave radar, to a target retroreflector or the scattered reflection from a passive target. Most conventional surveying instruments employ a retroreflector target in order to clearly define the measurement point, improve the signal-to-noise ratio of the return signal, and thus operate at reduced power. While typically not as accurate as the laser interferometer, EDM offers a major advantage over the interferometer for many applications. Unlike the interferometer, which inherently measures a differential distance—and thus must be used in a fringe counting integration mode to measure between two points without a break in the signal, EDM measures the absolute distance between the instrument and target. Thus, there is no requirement to integrate over a path while physically moving the target retroreflector through the measurement volume. This allows EDM to be used to measure multiple targets by switching between targets at will. The operating range of conventional EDMs are kilometers, while the operating range of typical laser interferometers are less than 100 meters.

A number of laser interferometer and electronic distance measurement applications desire an even wider angle of acceptance or multiple retroreflectors. A problem with using multiple retroreflectors is that not all of the retroreflectors can be located at a common measurement point. When the measurement axis does not pass through the measurement point, the resulting measurements are sensitive to rotations of the object and/or angle between the instrument and object, i.e., the Abbe error (See Ted Busch, Fundamentals of Dimensional Metrology (Delmar, 1988)).

Surveying equipment manufacturers have assembled solid glass retroreflectors, such as the Leica™ GRZ4 360 degree prism. However, as described in L. A. Kivioja, The EDM Corner Reflector Constant is Not Constant, *Surveying and Mapping* 143–55 (June 1978) and D. C. Hogg, Optical Center of a Glass Three-mirror: Its Measurement, *Applied Optics*, 15(2):304–305 (February 1976), the glass offset, or extra delay due to the reduced speed of light in glass, is a function of the incident angle, and the coverage overlaps between adjacent retroreflectors, so there is a significant Abbe error for the GRZ4.

Laser interferometers are typically calibrated in a back-to-back retroreflector configuration, where the rotation of the retroreflectors is constrained. For example, the National Institute of Standards and Technology (NIST) has built a Laser Rail Calibration System (Larcs) for calibrating laser trackers against an interferometer on a linear rail. Tracking laser interferometers are discussed in U.S. Pat. Nos. 4,714,339 to Lau et al.; and 4,790,651 to Brown et. al. Larcs uses two spherically mounted retroreflectors (SMRs) (described in more detail below), in a back-to-back configuration on a carriage, to build a bidirectional retroreflector assembly, i.e., one direction fixed for the reference interferometer parallel to the rail, and the other free to rotate in a nest to accommodate the laser tracker under test.

The Abbe error is minimized by mounting the two retroreflectors as close as practical and constraining the carriage to a rail system to minimize rotations of the assembly. However, for portable rails, the uncertainty due to the Abbe error is estimated to be a significant part of the total error budget.

NASA has built custom hollow retroreflector assemblies with a common physical reflection point, and thus eliminated the Abbe error. See Schmidtlin et. al., Novel Wide Field-of-View Laser Retroreflector for the Space Interferometry Mission, *Conference on Astronomical Interferometry*, Vol. 3350, 81–88, SPIE, 1998 and NASA Jet Propulsion Lab, Wide-Angle, Open-Faced Retroreflectors for Optical Metrology, *Photonics Tech Briefs*, 15a–16a, (March 1999).

These solve the Abbe error problem for some classes of measurements. However, since these retroreflectors share a common physical point, they sacrifice part of the center aperture, are difficult to build, are difficult to reference to an outside mechanical point, are expensive for routine applications, and the directions are not adjustable.

Gelbart et. al. in U.S. Pat. Nos. 5,305,091 and 5,920,394 describe an "omnidirectional retroreflector" pair combined with a fixed probe. By multilaterating on the pair of retroreflectors, the probe coordinate is calculated. The omnidirectional retroreflectors, described in the '091 patent, "consist of two concentric spheres made of transparent material and having the refractive index of the inner sphere higher than the refractive index of the outer sphere, the outside sphere coated with a partially reflective coating."

As described by Takatsuji et. al., Whole-Viewing-Angle Cat's-Eye Retroreflector as a Target of Laser Trackers, *Measurement Science Technology*, 1O:N87–N90 (1999), ideal omnidirectional spherical retroreflectors have recently been built from high index of refraction materials. Unfortunately, the glass is difficult to work, expensive, and the return power is low due to the spherical aberration and small working aperture, as well as the low reflection coefficient of the glass/air interface on the back side of the sphere, i.e., most of the power is transmitted through the sphere.

Laser trackers incorporate a laser interferometer with an automated mirror system to track a retroreflector. The interferometer measures differential range very accurately, with the fundamental limitation being the uncertainty of the index of refraction—which is typically in the 1 ppm range.

The angle measurements are somewhat less accurate. The fundamental limitation is atmospheric turbulence and temperature gradients bending the beam. There are also practical limitations with the encoders, mechanical system, beam quality, gravitational vector reference frame, etc.

Nakamura et al., A Laser Tracking Robot Performance Calibration System Using Ball-Seated Bearing Mechanisms and a Spherically Shaped Cat's-Eye Retroreflector, *Review of Scientific Instruments*, 65(4):1006–1011, (April 1994), points out that for a distance measurement uncertainty of δr, in an ideal orthogonal trilateration measurement, the uncertainty volume is $(\delta r)^3$. For two angles and a distance measurement, the uncertainty volume is $(r\delta\theta)^2 \delta r$. For example, for a typical distance measurement uncertainty of 1 ppm ($\delta r/r = 10^{-6}$) and an angle uncertainty of one arc second ($\sim 5 \times 10^{-6}$ radians), the trilateration uncertainty, for three equal distances r, the uncertainty volume would be $$\delta v = r^3 10^{-18}$$

whereas the uncertainty volume for two angles and a distance would be $$\delta v = 25 r^3 10^{-18},$$

or 25 times greater than the trilateration uncertainty volume—hence the inherent potential improvement in accuracy by using multiple distance measurements. In practice, there are two primary obstacles to achieving this huge improvement. Conventional retroreflectors do not support simultaneous measurements in the three orthogonal directions, and in actual field conditions it can be hard to mount an instrument on a stable tower or structure.

U.S. Pat. Nos. 5,530,549 and 5,861,956 to Brown et al., describe a probing retroreflector in which the distance to a probe tip can be determined. In Brown et al. a line between a retroreflector and a probe tip is bisected by a single mirror. The length of the optical path between the mirror and the probe tip is the same as the length of the optical path between the mirror and the apex of the retroflector. The system has allowed the use of retroreflectors in spaces that can not normally be reached by a typical retroreflector. This system, however, does not allow measurements to be simultaneously taken from different directions.

Laser trackers typically use spherically mounted retroreflector (SMR) targets. These are typically hollow or cat's-eye type retroreflectors, with the optical centers carefully located in the center of the spherical mounting—thus allowing the optical measurements to be related to the physical center of the sphere. Hollow SMRs, such as those built by PLX Inc.® are more economical than cat's-eye SMRs, but have a reduced angle of acceptance and thus are more susceptible to dropping the laser interferometer beam while tracking.

An improvement in the accuracy of the laser tracker (or EDM) is to use multiple instruments and/or augment with additional information, e.g., known artifacts, stable bench marks, hydrostatic leveling, or other constraints. For three or more instruments, oriented in the proper baselines, the less accurate angle measurements can be neglected or weighted less in a least squares, or more sophisticated, reduction.

While crosstalk between instruments is not a problem using multiple laser trackers on a common SMR, the relatively small angle limitation of even the cat's-eyes makes the instrument baselines unfavorable for high accuracy multilateration measurements, and of course the Abbe error is the limitation for conventional assemblies of SMRs.

As described by Parker et. al., Metrology System for the Green Bank Telescope, in *Proceedings ASPE* 1999 *Annual Meeting*, pages 21–24 (American Society for Precision Engineering, 1999). The Robert C. Byrd Green Bank Telescope large-scale metrology system was designed to operate as a multilateration system employing 18 laser ranging instruments measuring ranges to cardinal points on the moving telescope. While some paths are physically blocked by the structure, it behooves the designers to use multidirectional retroreflectors in order to maximize the number of independent measurements, and thus strengthen the calculation of cardinal point coordinates.

The increasing interest in multilateration, using laser trackers or other EDMs, has created a need for less expensive and more practical multidirectional retroreflectors with zero Abbe error.

In addition, in some retroreflector applications it may be desirable to attenuate the return beam from the retroreflectors. For example, in some electronic distance measurement applications, the dynamic range may be such that the signal is preferably attenuated for close-range measurements in order to avoid non-linearities in the detector electronics.

To account for time of flight or, alternatively, phase shift through the attenuator, any attenuating filter may need correction for the group index of refraction of the attenuating medium. Also, the cosine theta error for the thickness of the filter is preferably avoided. Finally, additional surfaces can introduce additional reflections which can introduce phase errors and make the retroreflector sensitive to orientation.

SUMMARY OF THE INVENTION

Broadly described herein are multidirectional retroreflectors and methods and systems for utilizing retroreflectors. The retroreflectors use a common virtual reflection point that is shared by multiple retroreflectors. The same concept can be extended to optical targets by replacing the retroreflector with an optical target.

One embodiment of the invention is directed to a multidirectional retroreflector that includes a first mirror, a first retroreflector, and a second retroreflector. The first mirror is positioned to reflect a light beam onto the first retroreflector and the optical path length to the first retroreflector from the first mirror is equal to the optical path length from the first retroreflector to a virtual position. The second retroreflector is positioned at the virtual position or is positioned away from the virtual position at a position that has the same optical path length as the optical path length to a second mirror.

Preferably, the first retroreflector is a three-mirror retroreflector or a cat's eye retroreflector. Preferably, the first mirror and first retroreflector are mounted together. Preferably, the mount is magnetic. Preferably, the first mirror and first retroreflector are mounted on a flat, three ball, Kelvin or "V" foot mount.

Another embodiment of the invention is directed to a multi-directional retroreflector that comprises a mirror, a retroreflector and a cubic, spherical or cylindrical manifold. The mirror is positioned to reflect a light beam onto the first retroreflector and the optical path length to the first retroreflector from the first mirror is equal to the optical path length from the first retroreflector to a virtual position. The mirror and retroreflector are adjustably mounted to the manifold.

Another embodiment of the invention is directed to a method of reflecting one or more light beams from multiple directions that comprises reflecting a light beam off of a first mirror and onto a retroreflector mounted on a manifold at a first postion. Then moving the retroreflector to a second position on the manifold and reflecting a light a reflecting a light beam off of beam off of the mirror and the retroreflector mounted at the second position.

Another embodiment of the invention is directed to a method of reflecting one or more light beams from multiple directions that comprises reflecting a light beam off of a first mirror and onto a first retroreflector, wherein the optical path length to the first retroreflector from the first mirror is equal to the optical path length from the first retroreflector to a virtual position. This embodiment also comprises reflecting a light beam off of a second retroreflector, wherein the second retroreflector is positioned at the virtual position or is positioned away from the virtual position at a position that has the same optical path length as the optical path length to a second mirror.

Other embodiments and advantages of the invention are set forth in part in the description, which follows, and in part, may be obvious from this description, or may be learned from the practice of the invention.

DESCRIPTION OF THE DRAWINGS

The invention can be understood by reference to the Detailed Description of the Invention when taken together with the attached drawings, wherein.

DESCRIPTION OF THE INVENTION

The invention is directed to multi-directional retroreflectors, systems comprising such retroreflectors and methods for operating retroreflectors. The described configurations allow for multiple retroreflectors to virtually share the same reflection point. The configuration can be used to make simultaneous measurements or sequential measurements from a range of directions using two or more retroreflectors that cannot be serviced by a single retroreflector without turning the retroreflector.

In the standard three-mirror retroreflector, the retroreflector apex is positioned at the point. Since multiple apexes can not be placed at the same physical position, a method of virtually positioning a retroreflector at a reflection point has been used to place multiple retroreflectors at the same position.

Virtually positioning a retroreflector at a position means that the retroreflector is not actually physically positioned at the virtual position. However, the optical path length, and angle, of a light beam to the actual retroreflector, is the same as the optical path length, and angle, to the virtual position. Accordingly, the retroreflector acts as though the apex is positioned at the virtual reflection point.

To obtain wide angle/multidirectional coverage, multiple (i.e. more than one) retroreflectors share the same virtual reflection point. At least one of the retroreflectors is virtually positioned at the virtual reflection point. In addition a single retroreflector can also be actually positioned at the virtual reflection point. Alternatively, all of the retroreflectors can be virtually positioned at the virtual reflection point. If all of the retroreflectors are virtually positioned at the virtual reflection point, the virtual reflection point can be the location of an inaccessible location or the location of another piece of equipment.

To virtually position a retroreflector, a line connecting a three-mirror retroreflector, or other standard retroreflector, and a virtual reflection point is bisected by a first surface mirror. In this configuration, the retroreflector apex and the virtual point become a conjugate pair, i.e., a beam directed at the virtual reflection point that intersects the first surface mirror and is reflected by the mirror to the retroreflector. The distance between the first surface mirror and the retroreflector is the same as the distance between the retroreflector and virtual reflection point. Accordingly, the optical path length, and angle, to the image of the retroreflector, is identical to the optical path length, and angle, to the virtual reflection point.

By using a three-mirror hollow retroreflector in combination with the first surface mirror in a mechanically fixed relative geometry, the four-mirror retroreflector assembly is insensitive to the orientation of the four-mirror retroreflector, i.e., the assembly can be roughly oriented with respect to the optical paths.

A cat's-eye retroreflector can replace the three-mirror retroreflector, for applications that need larger acceptance angles. In this embodiment, the center of the cat's-eye would replace the apex of the hollow retroreflector. For EDM measurements, the glass offset(s), due to the slower speed of light in glass, is typically corrected for, but it would be a constant and independent of the viewing angle. For interferometer measurements, the glass offset is preferably absorbed into the interferometer initialization.

The maximum aperture of the first surface mirror is determined by the retroreflector acceptance angle and distance to the mirror.

Figure 1:
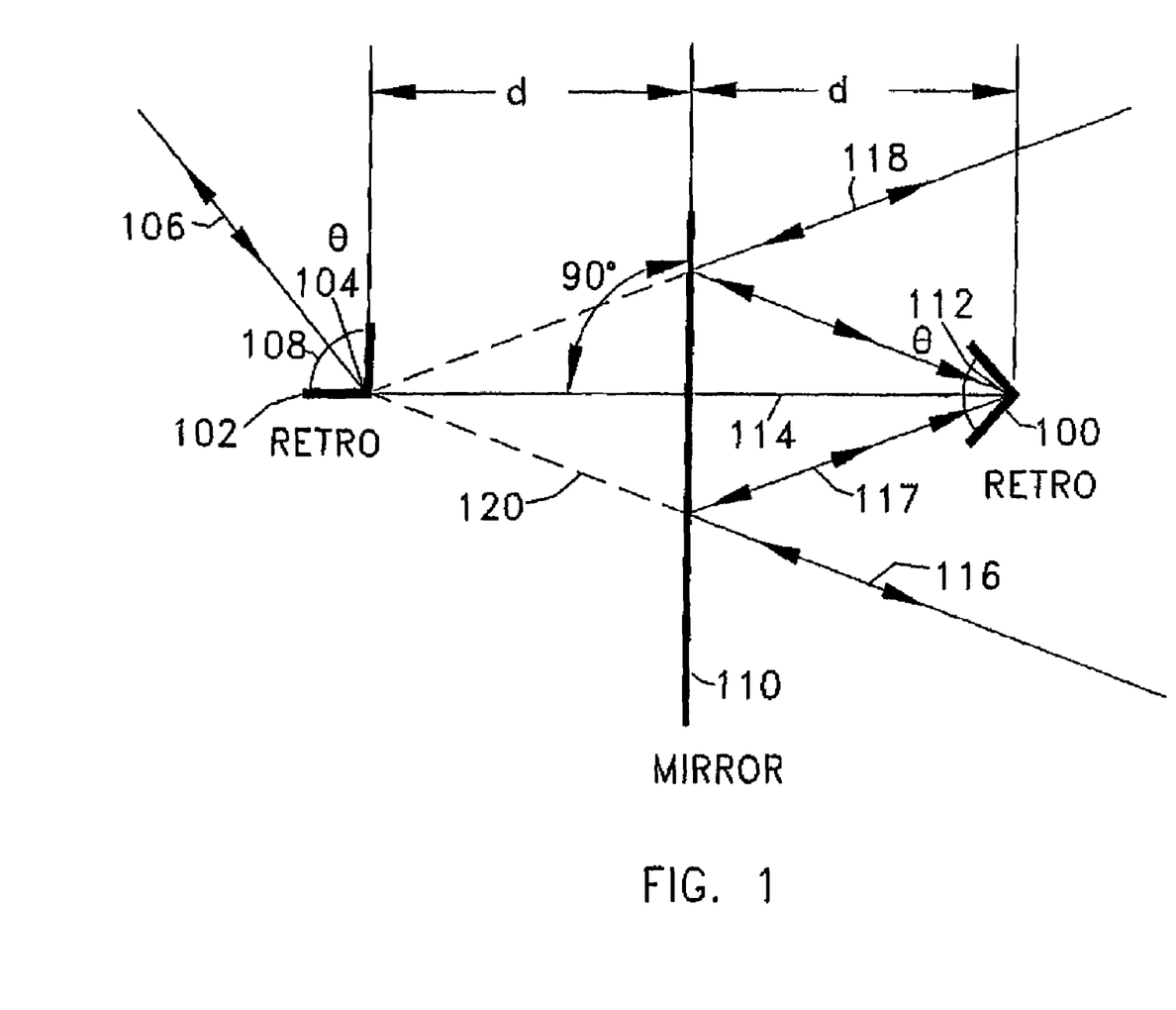
FIG. 1 is one embodiment of a multidirectional retroreflector including a conventional three-mirror retroreflector and a four-mirror retroreflector that share a common virtual point.

FIG. 1 shows one embodiment of a multidirectional retroreflector. The multidirectional retroreflector includes two retroreflectors 100 and 102. Retroreflector 102 apex is placed at position 104. Position 104 is the end point of the position being measured. Retroreflector 102 operates as a traditional retroreflector. If retroreflector 102 is a three-mirror retroreflector, first reference beam 106 will be returned back in the direction that reference beam 106 traversed as long as it is within the 30–40 degree cone 108 covered by the three-mirror retroreflector.

Retroreflector 100 is placed at a position 112. Mirror 110 is positioned halfway between position 104 and position 112. The mirror surface is oriented perpendicular to the line 114 connecting position 104 and position 112. Mirror 110 and three-mirror retroreflector 100 form a four-mirror retroreflector configuration. In this arrangement, reference beam 116, directed at point 104, has the same phase and travels the same distance after being reflected by retroreflector 100 and mirror 110 as it would after being reflected by a retroreflector positioned at position 104. Reference beam 116 is first reflected off of mirror 110 and then onto retroreflector 100 via 117. Reference beam 116 is then returned back to mirror 110 via a path parallel to 117 and back to the beam source following a path parallel to 116. Note that virtual path 120 has the same optical path length as 117. Similarly, reference beam 118 also travels the same distance to retroreflector 100 positioned at position 112 as it would travel to position 104.

Accordingly, this configuration allows for a retroreflector to be virtually positioned at the same location as another retroreflector. This configuration can be used to make simultaneous measurements or sequential measurements from a range of directions that cannot be serviced by a single three-mirror retroreflector without turning the retroreflector.

Note that the retroreflector 102 can be oriented in any direction, e.g., 180 degrees to the four-mirror retroreflector path (for back-to-back measurements) or orthogonal (including into and out of the paper) to the four-mirror retroreflector path for X-Y measurements, etc. Moreover, the direction of retroreflector 102 can be fixed or adjustable, and captive or separable (such as a SMR/nest configuration).

Figure 2:
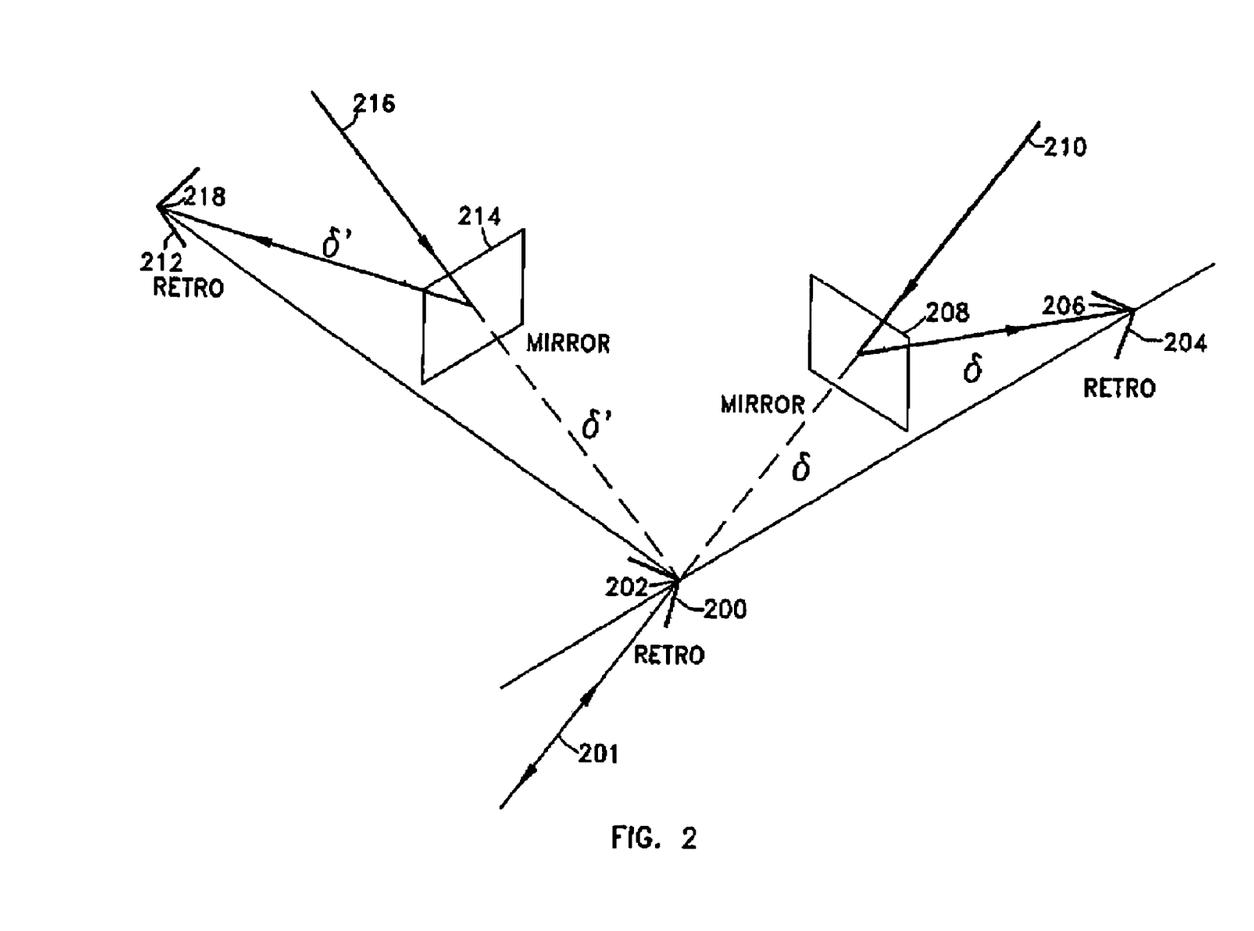
FIG. 2 is another embodiment of a multidirectional retroreflector including two, four-mirror retroreflectors that share a common virtual reflection point.

Since the four-mirror retroreflector described in FIG. 1 does not physically intersect the virtual reflection point, the bidirectional assembly can also be extended to multiple mirrored retroreflectors, as shown in FIG. 2. The mirrored retroreflectors preferably do not restrict the visibility of other retroreflectors.

In FIG. 2, retroreflector 200 is positioned at measurement position 202. Reference beam 201 is directly reflected by retroreflector 200. A first, four-mirror retroreflector that includes a mirror 208 and a three-mirror retroreflector 204 is positioned in the path of beam 210. The distance between mirror 208 and position 202 is the same as the distance between mirror 208 and position 206, the location of retroreflector 204. Beam 210 is reflected by mirror 208 to retroreflector 204. Retroreflector 204 returns beam 210 to mirror 208 and back to the beam source following the same path it took to retroreflector 204. In this arrangement, reference beam 210 has the same phase and travels the same distance after being reflected by retroreflector 204 and mirror 208 as it would after being directly reflected by a retroreflector positioned at position 202.

A second four-mirror retroreflector that includes a mirror 214 and a three-mirror retroreflector 212 is positioned in the path of beam 216. The distance between mirror 214 and position 202 is the same as the distance between mirror 214 and position 218, the location of retroreflector 212. Beam 216 is reflected by mirror 214 to retroreflector 212. Retroreflector 212 returns beam 216 to mirror 214 and back to the beam source following the same path it took to retroreflector 212. In this arrangement, reference beam 216 has the same phase and travels the same distance after being reflected by retroreflector 212 and mirror 214 as it would after being directly reflected by a retroreflector positioned at position 202. Note that the distances between points 202 and 206, and 202 and 218 are independent, i.e., the mirrors bisect the respective lines.

The multidirectional retroreflector described with reference to FIG. 2 can be extended to include several more four-mirror retroreflectors. In addition, a cluster of four-mirror retroreflectors can be used without any directly illuminated retroreflector. In this embodiment a cluster of four-mirror retroreflectors can be positioned around a virtual point in the middle of the cluster of four-mirror retroflectors.

The multidirectional retroreflector assemblies can be manufactured by methods known in the art. In a practical application of a multidirectional retroreflector using the four-mirror retroflector configuration, the line between the three-mirror retroreflector apex and the virtual measurement point is typically bisected with a first surface mirror. Mechanically locating the apex of a three-mirror retroreflector can be accomplished by carefully inserting a sphere, such as a precision diameter ball bearing of radius r, into the retroreflector. The center of the sphere is located at a height of:

$$h = \sqrt{3}\,r$$

from the apex.

The Abbe error, due to the distance between the center of the sphere and the apex can be a problem. The orientation of the three-mirror retroreflector can be established by auto-collimating on each of the retroreflector mirrors, or by building a fixture to fix the orientation. A solid glass retroreflector mounted in a fixture can be used to orient a hollow three-mirror retroreflector. The hollow retroreflector is gently dropped over the inverted glass retroreflector of known geometry and orientation, and thus transferring the known geometry and orientation to the hollow retroreflector, which can then be fixtured.

While the multidirectional retroreflectors can be constructed in a fixed manner, the four-mirror retroreflector assemblies could also be built separately and then the assemblies can be configured individually as needed. For example, by building four-mirror retroreflectors, with a uniform offset and footing, any number of configurations can be configured. The foot could be a fixed attachment or magnetic base to facilitate rapid reconfiguration and adjustment.

Figure 3:
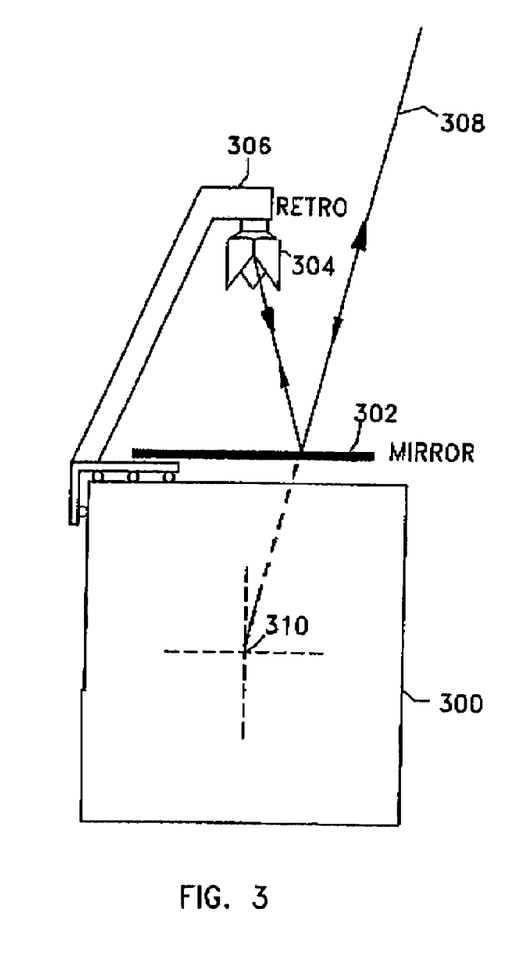
FIG. 3 is a four-mirror retroflector mounted on a cubic manifold with the virtual reflection point located in the center of the cube.

For example, an orthogonal coordinate system can be constructed by placing one or more four-mirror reflectors with a flat, three ball or Kelvin mount around a cubic manifold as shown in FIG. 3. In FIG. 3, a four-mirror retroreflector that includes a three-mirror retroreflector 304 and mirror 302 is mounted on a flat foot mount 306. One or more of these assemblies can be mounted on a cubic manifold 300. Beam 308, directed at point 310, will be diverted by reflecting off mirror 302 to retroreflector 304. The phase and angle of the returned beam will be the same as a beam directed directly to a retroreflector located in the center of the cube at point 310.

Figure 4:
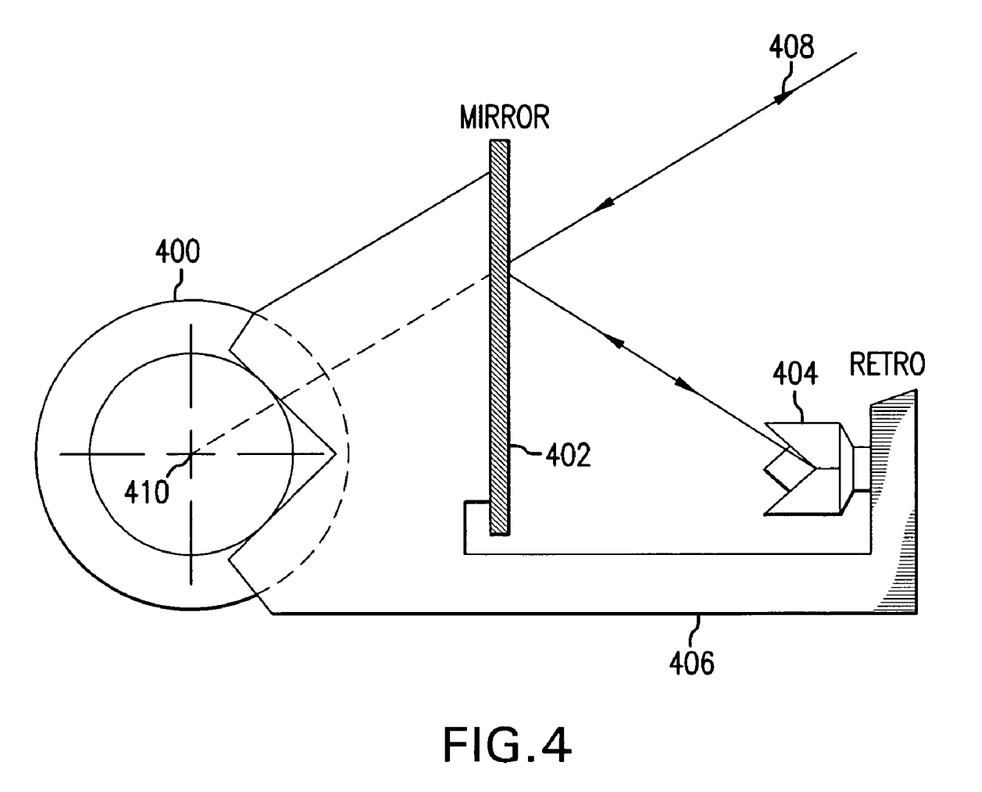
FIG. 4 is a four-mirror retroflector mounted on a cylindrical manifold with the virtual reflection point at the center of the cylinder.

A four-mirror retroreflector with a "V" foot could be used to mount an array of retroreflectors on a cylindrical manifold as shown in FIG. 4. In FIG. 4, a four-mirror retroreflector that includes four-mirror retroreflector 404 and mirror 402 are mounted on a "V" foot mount 406. One or more of these assemblies can be mounted on cylindrical manifold 400. Beam 408 can be reflected by four-mirror retroreflector 404 and mirror 402 to determine the position 410 in manifold 400.

Figure 5:
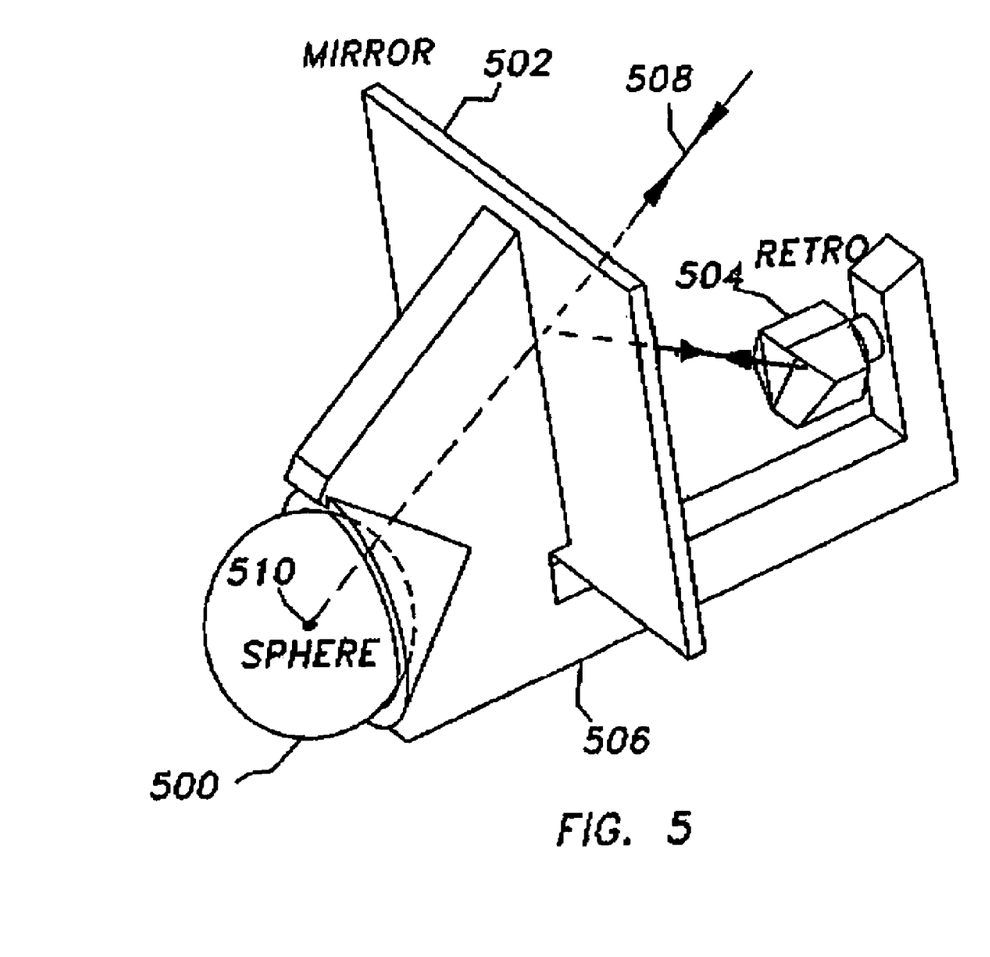
FIG. 5 is a four-mirror retroflector mounted on a spherical manifold with the virtual reflection point in the center of the sphere.

Finally, three-dimensional coverage can be obtained by a three-mirror retroreflector with a three-point, or conical, nest foot that attaches to a spherical manifold, as shown in FIG. 5. In FIG. 5, a three-mirror retroreflector that includes three-mirror retroreflector 504 and mirror 502 is mounted on conical nest foot mount 506. This assembly is then mounted on spherical manifold 500. Beam 508 can be reflected by three-mirror retroreflector 504 and mirror 502 to determine the position 510 in manifold 500.

Figure 6A:
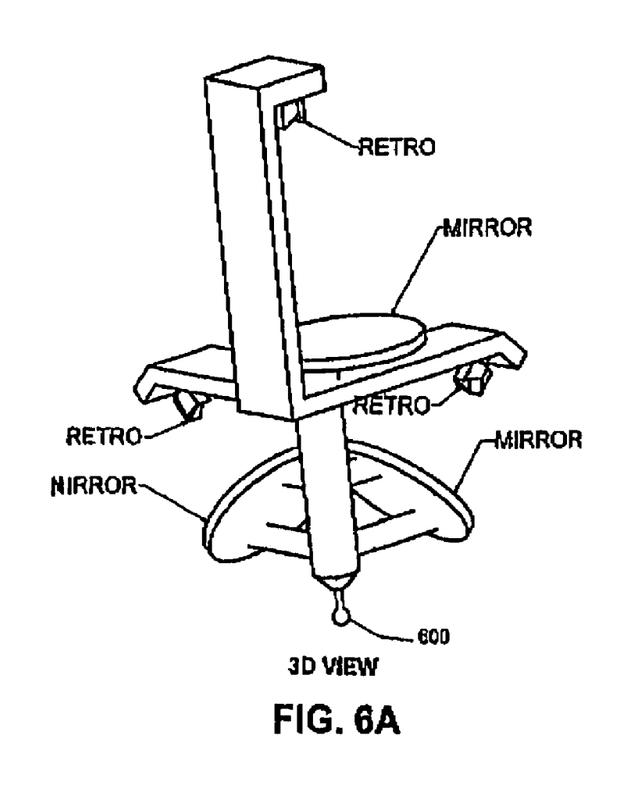
FIGS. 6A, 6B and 6C show a four-mirror retroreflector configuration in which measurements to a "hidden point" can be made from several different directions.
Figure 6B:
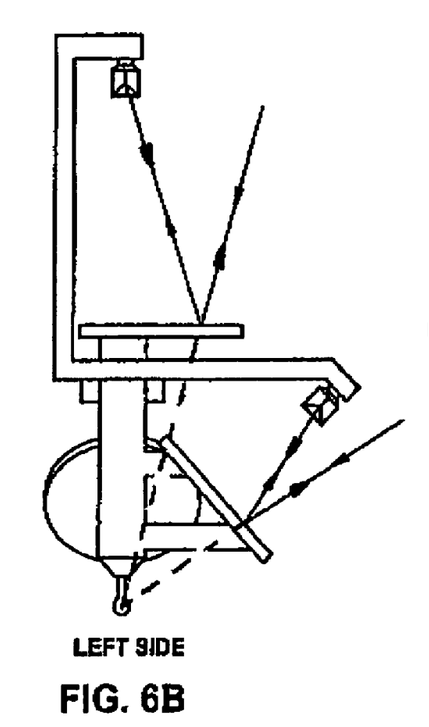
Figure 6C:
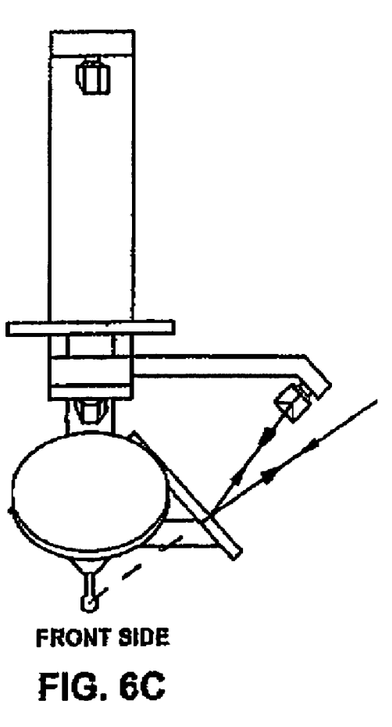

FIGS. 6A, 6B and 6C show a configuration in which measurements to a "hidden point" can be made from several different directions. The tip of stylus 600 indicates the point that is being measured.

Due to the fact that the Abbe error is eliminated, any of the suggested examples could be articulated. For example, an assembly could be mounted on a coordinate measurement machine, rotated about an axis by a motor; or maintained in a fixed orientation, with respect to gravity, by a pendulum counterweight, e.g., to compensate for the rotation in elevation of a radio telescope.

In some application it may be desirable to attenuate the return beam from the retroreflectors. This can be accomplished by modifying a standard three-mirror retroreflector. In the modified design, one of the surface mirrors is replaced with a flat, OD 3 (transmission=$10^{-3}$), neutral density filter, i.e., instead of reflecting off an aluminized mirror, about 1% of the power is reflected off the front surface of the glass and the remaining power is absorbed by the filter. By using an absorbing type neutral density filter material, the additional reflections off the rear surface are virtually eliminated (the OD 3 filter is effectively an OD 6 for the double pass).

Since all retroreflector beams undergo a reflection at all three mirrors of a three-mirror retroreflector, additional surfaces could also be substituted for compounded attenuations. Alternatively, the first surface mirror in a four-mirror retroreflector can be substituted. Calibration of the retroreflector mechanical apex remains the same, as with the standard three and four-mirror retroreflectors.

Reflections from the front surface of the glass filter, unlike the metal mirrors, introduce polarization rotations which can introduce further attenuation if the detector input is polarization sensitive, e.g., if an isolator is used on the detector. Moreover, the reflection coefficient is angle of incidence dependent. By rotating the retroreflector about the optical axis, the polarization and angle of incidence (and thus reflection coefficient) are modulated, which can be used to adjust the attenuation.

To introduce a transient attenuation, such as when conducting a test of the sensitivity of the distance measurement to signal amplitude, a simple test can be conducted by misting a light fog onto the retroreflector under test. For example; by exhaling on the retroreflector (with proper eye protection), or placing a cup of hot water next to the retroreflector, a light mist will condense on the cool reflecting surfaces which will effectively kill the reflected power. This will rapidly evaporate away. By recording the distance measurement and power levels as the mist evaporates, a plot of distance vs. power level can be constructed.

While the description and examples relate to four-mirror retroreflectors for optical path length measurement, an extension of the concepts would be to replace any or all of the three-mirror retroreflector with an optical target for angle-only measurements, such as with theodolites.

While the examples refer to laser beams, the same concepts and configurations can be adapted for other radiation sources, e.g., microwaves and acoustics.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges and at other numerical ranges which persons skilled in the art will find this invention operable.

Other embodiments and uses of the invention will be apparent to those skilled in the art from consideration of the specification and practice of the invention disclosed herein. All references cited herein, including all U.S. and foreign patents, patent applications, all publications and other documentary materials, are specifically and entirely hereby incorporated by reference.

The invention claimed is:

1. A multi-directional retroreflector comprising:
   a first mirror;
   a first retroreflector, wherein the first mirror is positioned to reflect a light beam onto the first retroreflector and wherein the optical path length to the first retroreflector from the first mirror is equal to the optical path length from the first retroreflector to a virtual position; and
   a second retroreflector, wherein the second retroreflector is positioned at the virtual position or is positioned away from the virtual position at a position that has the same optical path length as the optical path length to a second mirror.

2. The multi-directional retroreflector of claim 1, wherein the first retroreflector is a three-mirror retroreflector.

3. The multi-directional retroreflector of claim 1, wherein the first retroreflector is a cat's eye retroreflector.

4. The multi-directional retroreflector of claim 1, wherein the first mirror and first retroreflector are mounted together by a mount.

5. The multi-directional retroreflector of claim 4, wherein the mount is magnetic.

6. The multi-directional retroreflector of claim 1, wherein the first mirror and first retroreflector are mounted on a flat, three ball, Kelvin or V foot mount.

7. A multi-directional retroreflector comprising:
   a mirror;
   a retroreflector, wherein the mirror is positioned to reflect a light beam onto the retroreflector and wherein the optical path length to the retroreflector from the mirror is equal to the optical path length from the retroreflector to a virtual position; and
   a cubic, spherical or cylindrical manifold, wherein the mirror and retroreflector are adjustably mounted to the manifold by an adjustable mount.

8. The multi-directional retroreflector of claim 7, wherein the manifold is cubic.

9. The multi-directional retroreflector of claim 7, wherein the retroreflector is a three-mirror retroreflector.

10. The multi-directional retroreflector of claim 7, wherein the retroreflector is a cat's eye retroreflector.

11. The multi-directional retroreflector of claim 7, wherein the adjustable mount is a V foot, three-point, or conical foot.

12. The multi-directional retroreflector of claim 7, wherein the manifold is spherical.

13. The multi-directional retroreflector of claim 7, wherein the manifold is cylindrical.

14. A method of reflecting one or more light beams from multiple directions comprising:
    reflecting a light beam off of a mirror and onto a retroreflector mounted on a manifold at a first position; and
    moving the retroreflector to a second position on the manifold and reflecting a light beam off of beam off of the mirror and the retroreflector mounted at the second position by an adjustable mount.

15. The method of claim 14, wherein the manifold is cubic, spherical or cylindrical.

16. The method of claim 14, wherein the retroreflector is a three-mirror retroreflector.

17. The method of claim 14, wherein the retroreflector is a cat's eye retroreflector.

18. The method of claim 14, wherein the adjustable mount is a V foot, three-point, or conical foot.

19. A method of reflecting one or more light beams from multiple directions comprising:
    reflecting a light beam off of a first mirror and onto a first retroreflector, wherein the optical path length to the first retroreflector from the first mirror is equal to the optical path length from the first retroreflector to a virtual position; and
    reflecting a light beam off of a second retroreflector, wherein the second retroreflector is positioned at the virtual position or is positioned away from the virtual position at a position that has the same optical path length as the optical path length to a second mirror.

20. The method of claim 19, wherein the first retroreflector is a three-mirror retroreflector.

21. The method of claim 19, wherein the first retroreflector is a cat's eye retroreflector.

22. The method of claim 19, wherein the first mirror and first retroreflector are mounted together by a mount.

23. The method of claim 22, wherein the mount is magnetic.

24. The method of claim 19, wherein the first mirror and first retroreflector are mounted on a flat, three ball, Kelvin or V foot mount.

* * * * *